(12) United States Patent
Dillon

(10) Patent No.: US 8,408,324 B2
(45) Date of Patent: Apr. 2, 2013

(54) REDUCING BUILD UP OF CROP RESIDUE ON SHANKS

(76) Inventor: Peter Dillon, Virden (CA)

( * ) Notice: Subject to any disclaimer, the term of this patent is extended or adjusted under 35 U.S.C. 154(b) by 0 days.

(21) Appl. No.: 12/878,243

(22) Filed: Sep. 9, 2010

(65) Prior Publication Data

US 2012/0061111 A1 Mar. 15, 2012

Related U.S. Application Data

(63) Continuation-in-part of application No. 12/570,711, filed on Sep. 30, 2009, now abandoned.

(51) Int. Cl.
*A01B 5/00* (2006.01)
*A01B 9/00* (2006.01)
*A01B 33/00* (2006.01)
*A01B 33/16* (2006.01)
*A01B 49/02* (2006.01)

(52) U.S. Cl. .............. 172/45; 172/66; 172/71; 172/122; 172/123; 172/145; 172/149; 172/173; 172/177; 172/180; 172/196; 172/543; 172/545; 172/608; 172/610; 172/612; 172/720; 172/732; 172/733; 111/139; 111/147; 111/148; 111/156; 111/159; 111/194

(58) Field of Classification Search .................. 111/139, 111/14, 141, 142, 147–149, 152–154, 156–162, 111/190, 191, 194; 172/35, 45, 66, 71, 118, 172/172/122, 123, 133, 145, 149, 170, 173–175, 172/177, 180, 195, 196, 199, 200, 514–518, 172/540, 543, 545, 606–610, 612, 681, 720, 172/721, 732, 733, 776

See application file for complete search history.

(56) References Cited

U.S. PATENT DOCUMENTS

| | | | |
|---|---|---|---|
| 5,477,792 A | 12/1995 | Bassett et al. | |
| 5,640,914 A | 6/1997 | Rawson | |
| 5,823,267 A * | 10/1998 | Burge et al. | 166/385 |
| 6,345,671 B1 | 2/2002 | Siemens et al. | |
| 2002/0148666 A1 * | 10/2002 | Simons | 180/228 |

FOREIGN PATENT DOCUMENTS

WO WO2009127066 10/2009

* cited by examiner

*Primary Examiner* — Christopher J. Novosad
(74) *Attorney, Agent, or Firm* — Edward J. Chalfie; Husch Blackwell LLP

(57) ABSTRACT

A residue clearing apparatus for a shank of an agricultural implement includes a spoked wheel adapted for attachment to the implement such that the spoked wheel rotates about a wheel axis oriented substantially horizontal and perpendicular to an operating travel direction of the implement and forward of the shank. A drive is operative to rotate the spoked wheel. The spoked wheel is oriented such that ends of spokes of the spoked wheel pass above the ground forward of the shank, and such that the ends of the spokes of the spoked wheel pass adjacent to a front face of the shank. The spokes may be resiliently or pivotally mounted to the wheel.

12 Claims, 3 Drawing Sheets

REDUCING BUILD UP OF CROP RESIDUE ON SHANKS

This invention is in the field of agricultural implements and in particular a trash clearing apparatus and method for agricultural implements, such as seeders.

BACKGROUND OF THE INVENTION

Excessive crop residue or trash left on a field after a crop is harvested can hamper field operations. Often it is required to turn the residue under the soil with a disc or plow in order to conduct field operations. It is also common to harrow the field to spread the crop residue evenly to facilitate field operations. It has also been known to burn the residue off the field or chop the residue with a rotary mower. Such discing, harrowing, and chopping is costly, and burning is harmful to the environment, and also wasteful of plant nutrients present in the crop residue.

Recently as well, minimum or zero tillage farming practices have become popular to preserve moisture and reduce erosion. In such practices no tillage is done to turn crop residues under the soil, and residue management has become increasingly important in agriculture.

Seeding implements generally include a ground engaging furrow opener mounted on the bottom end of a shank extending down from a seeding implement frame. Where the furrow opener is a knife or hoe type opener, the furrow opener is pulled through the soil to create a furrow, and crop residue flows around the shank. Longer crop residue pieces such as straws and vines are problematic. Most of these straws will flow to one side of the shank or the other, but some will contact the shank at a midpoint such that, as the shank moves forward, one end moves backward on one side of the shank and the other end moves backward on the other side of the shank and the straw then hangs on the shank with a portion dragging along on each side of the shank. These dragging pieces tend to pick up more pieces such that a sizable clump of residue can grow on the shank, increasing draft and interfering with penetration of the furrow opener into the ground.

While often these clumps will fall off to one side of the shank or the other, sometimes the clumps build up to the point where they start to mix with and push soil and the seeder plugs and must be raised to clear the residue and soil, and sometimes the mixed clumps and soil must be manually removed.

When the clumps do fall off on either side of the shank, the clumps tend to fall back onto the furrow directly behind the shank. Soil engaged by the furrow opener at the bottom of the shank flows around the sides of the shank and falls back behind the shank and into the furrow. Further, the area directly behind the shank is clear of crop residue and thus creates more or less a trench in the residue. When a clump moves off the side of the shank the moving soil appears to carry the clump around and behind the shank, and the standing residue adjacent to the sides of the trench tips the clump into the cleared area. In any event the clumps fall onto the furrow and interfere with the emergence of plants growing from seeds planted in the furrow.

Clumps that do not fall into the furrow are also problematic as they lay on the ground and form bumps such that the field becomes rough for travel in later passes over the field, and as wheels pass over the bumps, depth control of ground engaging tools is adversely affected.

In addition to seeding, other ground engaging tools such as cultivator shovels are used in cultivation of agricultural fields, and are subject as well to residue build up on shanks mounting the tools to the implement frame.

Where the furrow opener is a rotating disc, the residue does not build up on the shank because the disc rolls over heavy residue, interfering with disc penetration and seed placement.

For these reasons various trash clearing mechanisms have been developed to clear residue off a path along the ground ahead of the furrow opener, for example such as that disclosed in U.S. Pat. Nos. 5,640,914 to Rawson and 5,477,792 to Bassett et al. Such mechanisms provide one or more spoked wheels or discs running at an angle ahead of the furrow opener and kicking the residue to the side. U.S. Pat. No. 6,345,671 to Siemens et al. discloses a fingered wheel located adjacent to the furrow opener that pins crop residue to the ground surface and prevents the residue from lodging on the shank.

Patent Cooperation Treaty Application WO2009127066 of Beaujot discloses a system where a residue clearing member periodically moves laterally across the front face of the shank to move clumps of crop residue laterally and off the shank on one side or the other thereof. It is contemplated that these clumps may also fall back on top of the furrow as described above, or in any event leave the soil surface bumpy.

SUMMARY OF THE INVENTION

It is an object of the present invention to provide shank residue clearing for agricultural implements that overcomes problems in the prior art.

In a first embodiment the present invention provides a residue clearing apparatus for a shank of an agricultural implement. The apparatus comprises a spoked wheel adapted for attachment to the implement such that the spoked wheel rotates about a wheel axis oriented substantially horizontal and perpendicular to an operating travel direction of the implement and forward of the shank. A drive is operative to rotate the spoked wheel. The spoked wheel is oriented such that ends of spokes of the spoked wheel pass above the ground forward of the shank, and such that the ends of the spokes of the spoked wheel pass adjacent to a front face of the shank.

In a second embodiment the present invention provides an agricultural implement apparatus comprising an implement frame mounted for movement along the ground in an operating travel direction, a shank extending downward from the implement frame, and a ground engaging tool mounted on a bottom end of the shank. A spoked wheel is rotatably attached to the implement frame such that the spoked wheel rotates about a wheel axis oriented substantially horizontal and perpendicular to the operating travel direction of the implement frame and forward of the shank. A drive is operative to rotate the spoked wheel. The spoked wheel is oriented such that ends of spokes of the spoked wheel pass above the ground forward of the shank, and such that the ends of the spokes of the spoked wheel pass adjacent to a front face of the shank.

In a third embodiment the present invention provides a method of reducing buildup of crop residue on a shank of an agricultural implement comprising an implement frame mounted for movement along the ground in an operating travel direction, a shank extending downward from the implement frame, and a ground engaging tool mounted on a bottom end of the shank. The method comprises rotatably attaching a spoked wheel to the implement frame such that the spoked wheel rotates about a wheel axis oriented substantially horizontal and perpendicular to the operating travel direction of the implement frame and forward of the shank, and rotating the spoked wheel such that ends of spokes of the spoked wheel pass above the ground forward of the shank, and such that the ends of the spokes of the spoked wheel pass along and adjacent to a front face of the shank.

The invention provides an effective mechanism for preventing buildup of residue on a shank by providing spokes that move along the face of the shank to contact residue and move it upward off the shank before problematic clumps can form on the shank. It is contemplated that the spokes could also rotate so they move downward with respect to the shanks, moving the residue forward off the shank.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
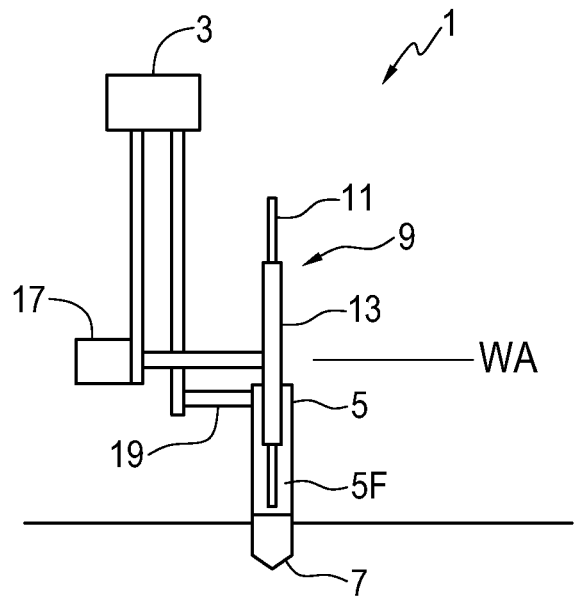
FIG. 1 is a schematic front view of an embodiment of a residue clearing apparatus of the present invention.
Figure 2:
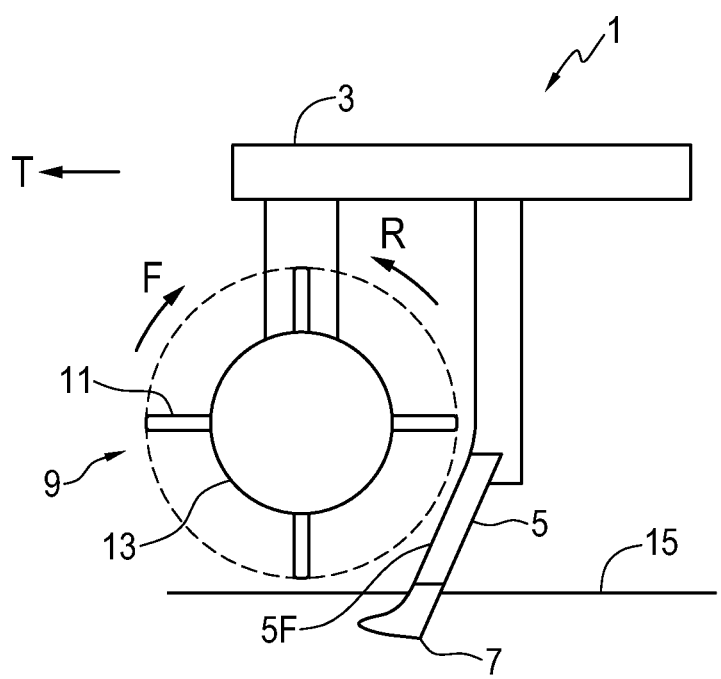
FIG. 2 is a schematic side view of the embodiment of FIG. 1.

FIGS. 1 and 2 schematically illustrate an embodiment of an agricultural implement apparatus 1 of the present invention. The apparatus comprises an implement frame 3 mounted for movement along the ground in an operating travel direction T. A shank 5 extends downward from the implement frame 3, and a ground engaging tool 7 is mounted on a bottom end of the shank 5.

A spoked wheel 9 is rotatably attached to the implement frame 3 such that the spoked wheel 9 rotates about a wheel axis WA oriented substantially horizontal and perpendicular to the operating travel direction T and forward of the shank 5. The spoked wheel 9 comprises a plurality of spokes 11 extending from a central wheel portion 13. In order to reduce breakage and stress on the spoked wheel 9, the spokes 11 are resiliently mounted to the central wheel portion 13 such that the spokes 11 can flex with respect to the central wheel portion 13. Spring teeth, such as are used on agricultural equipment for picking hay and like off the ground, provide a convenient and economical resiliently mounted spoke.

The spokes 11 can also be pivotally mounted to the central wheel portion 13 of the spoked wheel 9 about a pivot axis oriented substantially parallel to the wheel axis WA such that the spokes 11 can pivot with respect to the spoked wheel 9, with action like a flail, as described below and in FIG. 5. Such pivotally mounted teeth 11 can reduce shock loading on the spoked wheel 9 when the spokes contact an obstruction, such as a rock or the like, and also reduce the risk that rocks will be thrown and cause damage to equipment or persons. Such pivotally mounted spokes are also less likely to jam when encountering obstructions such as roots or the like.

The spoked wheel 9 is oriented such that the ends of the spokes 11 pass above the ground 15 forward of the shank 5, and such that the ends of the spokes 11 pass along and adjacent to the front face 5F of the shank 5. A drive, such as a hydraulic motor 17 is operative to rotate the spoked wheel 9. The hydraulic motor drive conveniently allows the speed of the spoked wheel to be adjusted to suit conditions.

In the illustrated apparatus 1, the shank 5 is mounted to the implement frame 3 by a bracket 19 extending laterally from an upper portion of the shank 5. The drive 17 is operative to rotate the spoked wheel 9 in a rearward direction R such that the ends of the spokes 11 move upward adjacent to the front face 5F of the shank 5. Because the shank is mounted offset by the bracket 19, the top of the shank 5 is open such that residue dragging on the shank 5 and contacted by the spokes 11 is moved upward and rearward over a top end of the shank 5.

It is also contemplated that the drive 17 could be operative to rotate the spoked wheel 9 in an opposite forward direction F such that the ends of the spokes 11 move downward adjacent to the front face 5F of the shank 5 such that residue dragging on the shank 5 and contacted by the spokes 11 is moved downward and forward off the shank 5. With the spoked wheel rotating in the forward direction F, the shank 5 can be a conventional shank instead of the illustrated offset shank 5, since the residue is moved forward off the shank and does not need to pass over the top end of the shank, which conventionally is attached to the implement frame so that the residue cannot pass freely over the top end thereof.

It is contemplated that with such a forward rotation increased power may be required to drive the spoked wheel since the spokes will be moving against the flow of the residue as opposed to the case where the spoked wheel rotates rearward and the spokes move with the flow of the residue. The spoked wheel may also need to rotate at increased speed. The speed of rotation that is required in order to effectively clear the residue from the shank 5 in any event is relatively slow. Where for example the diameter of the spoked wheel 9 is 20 inches, a speed of 50 revolutions per minute (rpm) appears to provide satisfactory clearing. This equates to a speed of the end of the spokes 11 with respect to the front face 5F of the shank 5 of about 4-4½ feet per second.

It is contemplated that higher speeds will work as well however will also require increased power, and be more subject to wear. It is also contemplated that it would be beneficial to provide a drive where the speed of rotation of the spoked wheel 9 can be adjusted. The speed can then be reduced where residue is light, or increased where residue is heavy.

While the drawings show four spokes 11 on each spoked wheel 9, this is only a convenient and balanced arrangement and it is contemplated that a larger or smaller number of spokes could suffice as well. Adjustments to the speed of rotation may be required depending on the number and configuration of the spokes 11. Where the spokes 11 are pivotally attached to the central wheel portion 13 sufficient rotational speed must be present to create enough centrifugal force that the spokes 11 extend.

In operation the ends of the spokes 11 move either up or down the front face 5F of the shank 5 so that straws, vines, and like pieces of crop residue that are building up in clumps on the shank 5 are contacted by the spokes and moved either forward or rearward off the shank. The spokes 11 are moving fast enough to throw the residue pieces and break up and scatter the clumps. The clumps are thus broken up and thrown forward or rearward so that clumps do not drop onto the furrow behind the shank 5 and interfere with plants emerging from seeds planted in the furrows.

In the illustrated apparatus 1, the shanks 5 are also oriented as illustrated to slope rearward and upward from the ground engaging tool 7, so that the residue flows readily up the front face 5F of the shank 5 to the location where the ends of the spokes 11 are closest to the front face 5F of the shank 5 such that hanging straws and the like move into contact with the spokes 11 and are moved off the shank 5 before they build up into larger clumps.

The schematically illustrated apparatus 1 is of the type where the implement frame 3 moves down to engage the tool 7 in the ground 15, or up to raise the tool out of the ground. The spoked wheel 9 and shank 5 are fixed to the implement frame 3 and are thus maintained in the same orientation as the implement frame 3 moves up and down. The spoked wheel 9 will be located so that when the ground engaging tool is in the deepest contemplated position, the ends of the spokes will be one to two inches above the ground 15. As seen in FIG. 2, the spoked wheel will be located so the ends of the spokes 11 will typically be closest to the front face 5F of the shank 5 at the upper portion of the shank.

Figure 3:
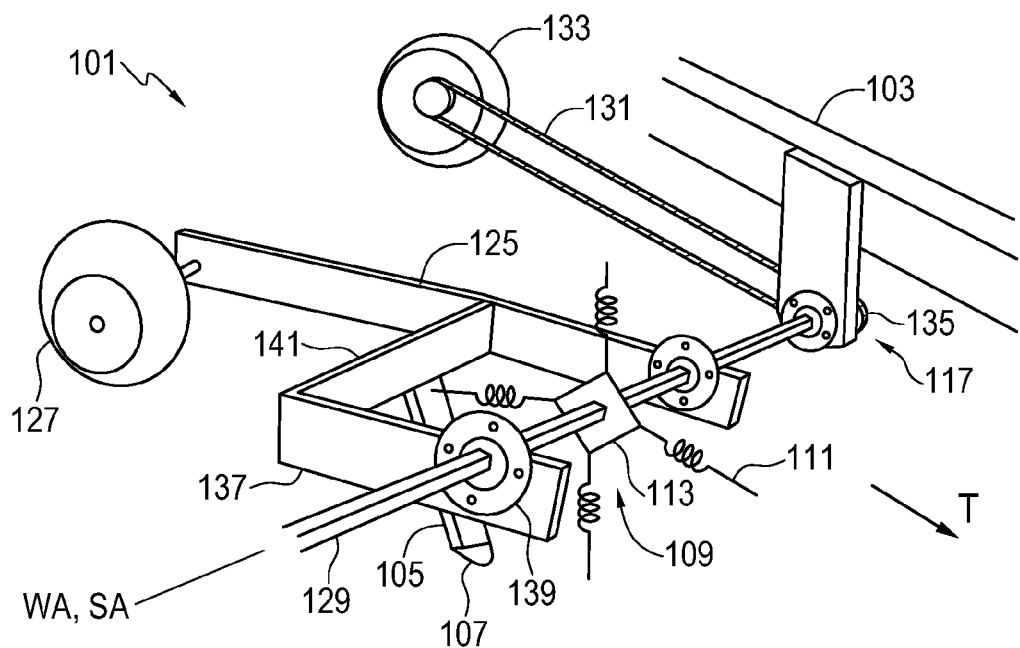
FIG. 3 is a schematic front perspective view of an alternate embodiment of a residue clearing apparatus of the present invention.
Figure 4:
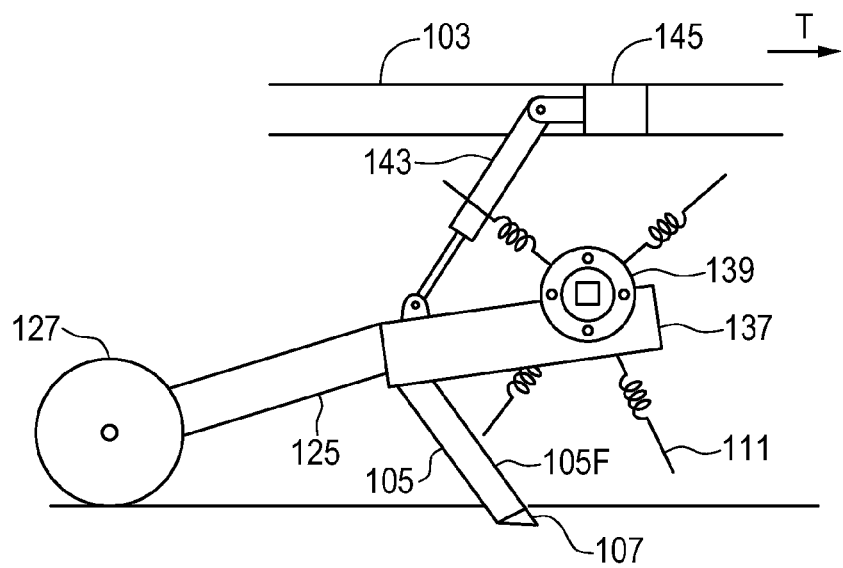
FIG. 4 is a schematic side view of the embodiment of FIG. 3.

In another popular type of seeding implement, the frame remains at a fixed height above the ground, and the shanks are moved up and down individually, typically by individual hydraulic cylinders on each shank assembly. FIGS. 3-4 schematically illustrate an agricultural implement apparatus 101 of the present invention where the shank 105 is mounted on a trailing arm 125 with a packer wheel 127 rotatably mounted to the rear end thereof in alignment with the shank 105.

A drive shaft 129 is mounted to the implement frame 103 and is rotatable about a shaft axis SA oriented substantially horizontally and perpendicular to the operating travel direction T. The spoked wheel 109 comprises a central wheel portion 113 fixed to the drive shaft 129, and spring teeth providing the spokes 111. The drive 117 is illustrated as a ground drive comprising a chain 131 driven by a ground wheel 133 of the implement and connected to a sprocket 135 on the end of the drive shaft 129 such that the ground wheel 133 rotates the drive shaft 129 and the spoked wheel 109. Thus while it is contemplated that other arrangements would work as well, in the illustrated apparatus 101 the shaft axis SA coincides with the wheel axis WA.

The trailing arm 125 comprises a pair of arm segments 137 connected at front ends thereof to the drive shaft 129 by bearings 139 such that the trailing arm 125 can pivot up and down with respect to the drive shaft 129. The drive shaft 129 is designed to have sufficient strength to support the front ends of the trailing arm segments 137.

The shank 105 is mounted to the trailing arm 125 by a bracket 141 extending laterally from an upper portion of the shank 105 to the trailing arm 125. In the illustrated embodiment the bracket 141 extends laterally between the arm segments 137 and the shank 105 extends downward from the bracket 141 forward of the packer wheel 127 mounted on the rear end of the trailing arm 125.

As illustrated in FIG. 4, a bias element, provided by hydraulic cylinder 143, is connected to the implement frame 103 and is operative to exert a downward bias force on the trailing arm 125 when the implement is working to force the furrow opener 107 at the bottom of the shank 105 into the ground, and allow the trailing arm 125 to move up and down to follow the terrain of a field. The hydraulic cylinder 143 also serves to raise the trailing arm 125 to a transport position where the furrow opener 107 and packer wheel 127 are above the ground. The upper lateral frame member 145 to which the hydraulic cylinder 143 is mounted is removed in FIG. 3 to allow clearer illustration of the spoked wheel 109 and attachment of the trailing arm 125 to the drive shaft 129.

In the illustrated apparatus 101 the drive 117 is operative to rotate the spoked wheel 109 in a rearward direction such that the ends of the spokes 111 move upward adjacent to the front face 105F of the shank 105 and such that residue dragging on the shank 105 and contacted by the spokes 111 is moved upward and rearward over a top end of the shank 105 between the arm segments 137. As in the apparatus 1 described above, the shank 105 is oriented to slope rearward and upward from the furrow opener 107 to facilitate passage of residue up and over the shank.

It is contemplated that it could be possible to configure the spoked wheel 109 such that the tips of the spokes 111 engage the ground such that movement over the ground will cause the wheel 109 to rotate, but this arrangement would limit the rotational speed of the wheel, and could cause other unforeseen complications.

Figure 5:
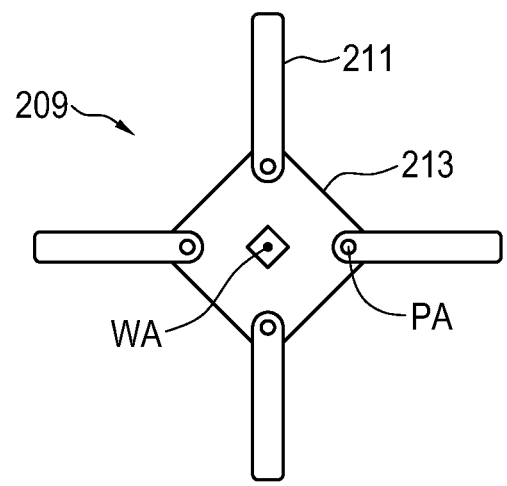
FIG. 5 is a schematic side view of spoked wheel where the spokes are pivotally mounted to the central wheel portion of the spoked wheel about a pivot axis oriented substantially parallel to the wheel axis.

FIG. 5 illustrates a spoked wheel 209 where the spokes 211 are pivotally mounted to the central wheel portion 213 of the spoked wheel 209 about a pivot axis PA oriented substantially parallel to the wheel axis WA such that the spokes 211 can pivot with respect to the spoked wheel 209. Such pivotally mounted teeth 211 can reduce shock loading on the spoked wheel 209, as the teeth 211 can pivot back when they strike an obstruction. As a spoke 211 pivots back, the end of the spoke moves closer to the center of the spoked wheel 209 to facilitate clearing an obstruction. The spoked wheel 209 can also be rotated in either the forward or rearward direction.

Figure 6:
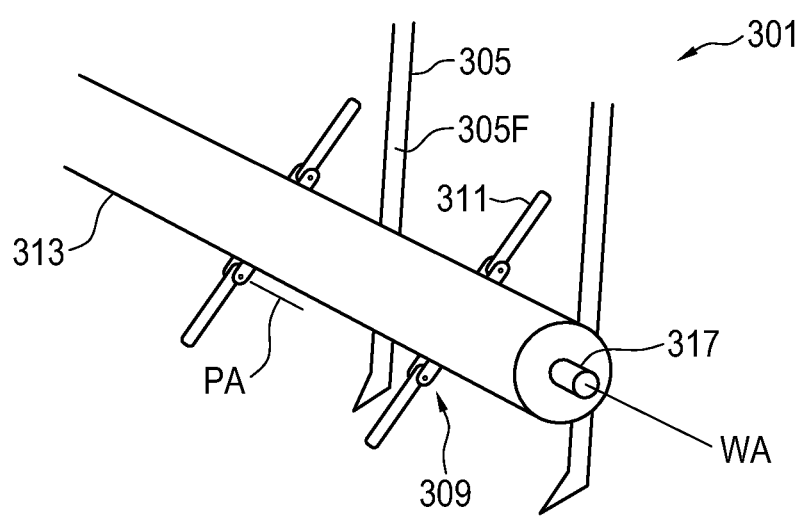
FIG. 6 schematically illustrates an embodiment of an agricultural implement apparatus of the invention where the spokes are pivotally mounted to a central wheel portion that is provided by a cylindrical shaft that extends laterally across a plurality of shanks and is rotated by a drive.

The above describes and illustrates only a single shank, however it is contemplated that rows of shanks will be provided in the manner as is well known in the art and that a spoked wheel will be provided in front of each shank. FIG. 6 schematically illustrates an agricultural implement apparatus 301 with a spoked wheel 309 where the spokes 311 are pivotally mounted to the central wheel portion 313 of the spoked wheel 309 about a pivot axis PA oriented substantially parallel to the wheel axis WA such that the spokes 311 can pivot with respect to the spoked wheel 309. In this spoked wheel 309 the central wheel portion 313 and the drive is provided by a cylindrical shaft that extends laterally across a plurality of shanks 305, and is connected to a hydraulic motor 317 or like drive. It is contemplated that the cylindrical shaft will reduce the incidence of straws and vines and the like wrapping around the shaft, In the illustrated apparatus 301 each spoked wheel 309 comprises two spokes 311 mounted opposite each other on the cylindrical shaft. Like pairs of spokes 311 are spaced along the cylindrical shaft so as to be located in front of each shank 305 and suitably located as described above with respect to the front face 305F of each shank 305.

The invention thus provides an effective mechanism for preventing buildup of residue on a shank by providing spokes that move along the face of the shank to contact residue and move it upward or forward off the shank before problematic clumps can form on the shank. Most of the straws and like pieces of crop residue flow to one side of the shank or the other, and only those that contact the shank and then hang on the shank are contacted by the spokes and moved either forward or rearward off the shank. Thus power requirements are relatively small, since only problematic straws are contacted, and not all straws. These straws are also contacted and moved before they form a large clump which also reduces the power required to disperse the clump and move the straws off the shank.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural implement apparatus comprising:
   an implement frame mounted for movement along the ground in an operating travel direction;
   a shank extending downward from the implement frame, and a ground engaging tool mounted on a bottom end of the shank;
   a spoked wheel rotatably attached to the implement frame such that the spoked wheel rotates about a wheel axis oriented substantially horizontal and perpendicular to the operating travel direction of the implement frame and forward of the shank, the spoked wheel rotated about the wheel axis by a drive;
   wherein the spoked wheel rotates about the wheel axis in a plane that is substantially vertical and aligned with, and forward of, a front face of the shank, and the spoked wheel is oriented such that ends of spokes of the spoked wheel pass above the ground forward of the shank, and such that the ends of the spokes of the spoked wheel pass adjacent to a front face of the shank.

2. The apparatus of claim 1 wherein the spokes are resiliently mounted to the spoked wheel such that the spokes flex with respect to the spoked wheel.

3. The apparatus of claim 2 wherein the spoked wheel comprises a plurality of spring teeth extending from a central wheel portion.

4. The apparatus of claim 1 wherein the spokes are pivotally mounted to the spoked wheel about a pivot axis oriented substantially parallel to the wheel axis such that the spokes pivot with respect to the spoked wheel.

5. The apparatus of claim 1 comprising a drive shaft mounted to the implement frame and rotatable about a shaft axis oriented substantially horizontally and perpendicular to the operating travel direction, the drive shaft connected to drive the spoked wheel, and wherein the drive rotates the drive shaft.

6. The apparatus of claim 5 wherein the shaft axis coincides with the wheel axis and the spoked wheel is fixed to the drive shaft.

7. The apparatus of claim 6 comprising:
   a trailing arm connected at a front end thereof to the drive shaft by at least one bearing such that the trailing arm pivots up and down with respect to the drive shaft;
   a packer wheel rotatably mounted to the trailing arm at a rear portion thereof; and
   a bias element connected to the implement frame and exerting a downward bias force on the trailing arm;
   wherein the shank extends downward from the trailing arm forward of the packer wheel.

8. The apparatus of claim 7 wherein the shank is mounted to the trailing arm by a bracket extending laterally from an upper portion of the shank to the trailing arm, and wherein the drive rotates the spoked wheel in a rearward direction such that the ends of the spokes move upward adjacent to the front face of the shank and such that residue dragging on the shank and contacted by the spokes is moved upward and rearward over a top end of the shank.

9. The apparatus of claim 7 wherein the drive rotates the spoked wheel in a forward direction such that the ends of the spokes move downward adjacent to the front face of the shank and such that residue dragging on the shank and contacted by the spokes is moved downward and forward off the shank.

10. The apparatus of claim 1 wherein the shank is mounted to the implement frame by a bracket extending laterally from an upper portion of the shank, and wherein the drive rotates the spoked wheel in a rearward direction such that the ends of the spokes move upward adjacent to the front face of the shank and such that residue dragging on the shank and contacted by the spokes is moved upward and rearward over a top end of the shank.

11. The apparatus of claim 1 wherein the drive rotates the spoked wheel in a forward direction such that the ends of the spokes move downward adjacent to the front face of the shank and such that residue dragging on the shank and contacted by the spokes is moved downward and forward off the shank.

12. The apparatus of claim 1 wherein the shank is oriented to slope rearward and upward from the ground engaging tool.

* * * * *